(12) United States Patent
Potrebic et al.

(10) Patent No.: US 9,241,125 B2
(45) Date of Patent: Jan. 19, 2016

(54) UNIFIED RECORDING AND PAUSE BUFFER FORMAT

(75) Inventors: Peter J. Potrebic, Calistoga, CA (US); Elizabeth Rose McEnroe, Palo Alto, CA (US); Peter T. Barrett, San Francisco, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 424 days.

(21) Appl. No.: 12/960,272

(22) Filed: Dec. 3, 2010

(65) Prior Publication Data
US 2011/0075985 A1   Mar. 31, 2011

Related U.S. Application Data

(63) Continuation of application No. 11/128,970, filed on May 13, 2005, now Pat. No. 7,848,618.

(51) Int. Cl.
*H04N 5/76* (2006.01)
*H04N 21/4147* (2011.01)
*H04N 21/426* (2011.01)
*H04N 21/433* (2011.01)
*H04N 21/44* (2011.01)
(Continued)

(52) U.S. Cl.
CPC ............ *H04N 5/76* (2013.01); *H04N 21/4147* (2013.01); *H04N 21/42646* (2013.01); *H04N 21/4334* (2013.01); *H04N 21/44004* (2013.01); *H04N 21/458* (2013.01); *H04N 21/47202* (2013.01); *H04N 21/8455* (2013.01); *H04N 5/765* (2013.01); *H04N 5/775* (2013.01); *H04N 5/781* (2013.01); *H04N 5/85* (2013.01); *H04N 5/907* (2013.01); *H04N 9/8042* (2013.01); *H04N 9/8227* (2013.01)

(58) Field of Classification Search
CPC ........................................................ H04N 5/85
USPC ............... 386/291, 295, 329; 725/37, 38, 61, 725/139–142, 25, 88, 134, 46
See application file for complete search history.

(56) References Cited

U.S. PATENT DOCUMENTS 6,483,986 B1   11/2002   Krapf et al.
6,708,251 B1    3/2004   Boyle et al.
(Continued)

FOREIGN PATENT DOCUMENTS

EP        1367824 A2    12/2003

OTHER PUBLICATIONS

"Digital Video Recorder: Pause, rewind, and fast-forward live TV", Cox Communications, printed Apr. 21, 2005, 2 pages.

*Primary Examiner* — Thai Tran
*Assistant Examiner* — Mishawn Hunter
(74) *Attorney, Agent, or Firm* — Micah P. Goldsmith; Judy Yee; Micky Minhas

(57) ABSTRACT

A unified recording format allows both recorded programs and paused buffered broadcasts to be stored in memory as a common virtual stream. As content is received on a channel, it is placed into the virtual stream with newer content at the start of the stream and progressively aging content migrating farther downstream. A front section of the stream effectively operates as a pause buffer, as the currently tuned broadcast program is recorded in this section and is responsive to pause/resume commands. Recorded programs are also stored as part of the same virtual stream. Pointers are used to identify the boundaries of the pause buffer, as well as the beginning and end of each recorded program in the virtual stream.

20 Claims, 7 Drawing Sheets

(51) Int. Cl.
    *H04N 21/458*     (2011.01)
    *H04N 21/472*     (2011.01)
    *H04N 21/845*     (2011.01)
    *H04N 5/765*     (2006.01)
    *H04N 5/775*     (2006.01)
    *H04N 5/781*     (2006.01)
    *H04N 5/85*     (2006.01)
    *H04N 5/907*     (2006.01)
    *H04N 9/804*     (2006.01)
    *H04N 9/82*     (2006.01)

(56) References Cited

U.S. PATENT DOCUMENTS

| | | |
|---|---|---|
| 6,714,720 B1 | 3/2004 | Lightstone et al. |
| 6,788,882 B1 | 9/2004 | Geer et al. |
| 7,023,924 B1 * | 4/2006 | Keller .............. H04N 21/23424 375/240.26 |
| 7,162,642 B2 | 1/2007 | Schumann et al. |
| 7,607,157 B1 * | 10/2009 | Inoue et al. ................... 725/102 |
| 8,813,122 B1 * | 8/2014 | Montie et al. ................... 725/34 |
| 2002/0009283 A1 * | 1/2002 | Ichioka et al. ................ 386/46 |
| 2002/0089603 A1 * | 7/2002 | Onomatsu ..................... 348/554 |
| 2002/0199185 A1 * | 12/2002 | Kaminski et al. ............... 725/25 |
| 2003/0044166 A1 | 3/2003 | Haddad |
| 2003/0133022 A1 * | 7/2003 | Melton ............... G11B 27/034 348/231.2 |
| 2003/0206719 A1 | 11/2003 | Bumgardner et al. |
| 2004/0013406 A1 | 1/2004 | Barton et al. |
| 2004/0060063 A1 * | 3/2004 | Russ et al. ..................... 725/46 |
| 2004/0091249 A1 * | 5/2004 | Mekenkamp .......... H04N 5/76 386/297 |
| 2005/0025469 A1 | 2/2005 | Geer et al. |
| 2005/0081242 A1 | 4/2005 | Kwok |
| 2006/0182412 A1 * | 8/2006 | Lefevre ........................... 386/65 |
| 2008/0320523 A1 * | 12/2008 | Morris et al. ................... 725/47 |
| 2012/0141096 A1 * | 6/2012 | Ellis et al. ..................... 386/297 |

* cited by examiner

UNIFIED RECORDING AND PAUSE BUFFER FORMAT

RELATED APPLICATIONS

This patent application is a continuation application of, and claims priority to, co-pending, commonly owned U.S. patent application Ser. No. 11/128,970, filed on May 13, 2005, and entitled "UNIFIED RECORDING AND PAUSE BUFFER FORMAT." The entire contents of the application are hereby incorporated herein by reference.

TECHNICAL FIELD

This invention relates to television entertainment and information architectures and, in particular, to digital video recording.

BACKGROUND

Digital video recorders are implemented as client devices to receive video and/or audio content in the form of broadcast and/or interactive television entertainment and information. A digital video recorder includes a hard disk memory so that a viewer can record multiple television programs and other content of interest to the viewer. A user can schedule what programs to record, and then watch them back at her leisure.

A digital video recorder also provides the viewer with convenient pause functionality, where she can pause the broadcast of a television program and return later to watch the program, while still in progress, from the point at which it was paused. To implement this functionality, a digital video recorder includes a pause buffer to record the broadcast as it is being watched. At any point, the viewer can rewind and playback the buffered broadcast to replay a scene or watch something that she may have missed the first time. A pause buffer is typically configured as a circular, or ring, buffer on the hard disk memory and the amount of time which a television program can be delayed is dependent upon how much storage space is allocated for the pause buffer. When a pause buffer reaches capacity (e.g., after 30 minutes), the content corresponding to the beginning of a pause event will be overwritten. In this manner, the pause buffer functions as a sliding thirty minute recorder of the most recently displayed content.

Although the digital video recorder stores the content on the hard disk memory for later playback, the way the two types of recorded content—pause buffer and scheduled recordings—are created, managed, and structured on the disk is quite different. This has led to some issues that impact user experience. One problem concerns channel changes. Since the pause buffer records the content received on a current channel, a change to another channel results in the pause buffer ceasing recordation of the first channel and commencing recordation of the second channel. In some cases, when a viewer changes channels, any content stored in the pause buffer is deleted (commonly referred to as "flushing" the pause buffer). Thus, an accidental channel change can cause an undesired loss of content. As a result, a viewer can only access content maintained in the pause buffer for the duration of time that the viewer watches a particular channel without changing the channel.

Another issue arises when a user pauses a program that is back-to-back with a scheduled recording. Once the recording begins, it can be difficult to playback the previous program from the pause buffer. Another situation that poses design difficulties is the ability to take the paused content in the pause buffer and "save" it as a persistent recording to be viewed later.

Users also have a poor experience when trying to record back-to-back programs on the same channel. For example, suppose a first show A ends at 9:00 pm and a second show B is scheduled to begin at 9:00 pm. In current digital video recorders, a back-to-back recording for shows A and B will make a transition precisely at 9:00 pm. However, in some situations, the first show A may not precisely end at 9:00 pm, but instead might continue past 9:00 pm (such as much as 30 seconds or a minute). In this situation, the recording for show A will end too early (at 9:00 pm), and the viewer will miss the last portion of the show (e.g., 30 to 60 seconds). To view the missed portion, the viewer would need to watch the beginning portion of the second show B, which was to start at 9:00 pm, but effectively started after 9:00 pm (e.g., at 9:00:30 or 9:01:00). In other situations, show A may end too early, before 9:00 pm, resulting in an earlier start for show B. This results in the reverse problem, where the first portion of show B is at the tail end of the recording for show A. These scenarios for back-to-back recording can result in a confusing, and perhaps frustrating user experience.

Accordingly, for television-based entertainment, there is a need for techniques to improve the way pause buffers and recorded programs are managed.

SUMMARY

A unified recording format allows both recorded programs and pause buffered broadcasts to be stored in memory as a common virtual stream. As content is received on a channel, it is placed into the virtual stream with newer content at the start of the stream and progressively aging content migrating farther downstream. A front section of the stream effectively operates as a pause buffer, as the currently tuned broadcast program is recorded in this section and is responsive to pause/resume commands. Recorded programs are also stored as part of the same virtual stream. Pointers are used to identify the boundaries of the pause buffer, as well as the beginning and end of each recorded program in the virtual stream.

In this manner, data in the pause buffer and data in a recorded program are managed in a unified manner, without any distinction between the two. The unified format removes barriers between recorded content and paused buffered content that, in the past, have resulted in clumsy user experiences. The unified format allows users to save pause buffer content indefinitely, record back-to-back programs without conflicts, and facilitate channel change without permanent lose of previously buffered content.

BRIEF DESCRIPTION OF THE CONTENTS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to a unified recording format that allows both scheduled recordings and paused broadcasts to be stored as a single virtual stream in memory. As content is received on a channel, it is continuously placed into the virtual stream. This forms a historically-arranged stream of content, with newer content at the start of the stream and aging content increasingly farther downstream. A beginning portion of the virtual stream effectively operates as a pause buffer. As the live program is received, it is recorded at the start of the virtual stream and available for playback in response to pause/resume commands. A pointer may be used to identify a current playback location in the stream. If a person is watching live TV, for example, the current playback location is at the start of the stream. If the current location is three minutes delayed, the pointer defines that location in the stream. When the person is viewing TV in normal "play" mode, the current playback location is moving forward in the stream in real time (i.e., one second of video for each second of real time). If the video is paused, the current playback location pointer is frozen, while the stream keeps growing at the front to buffer the live broadcast. The pointer can be moved backwards and forwards in the stream at faster rates in response to rewind and fast forward commands.

Recorded programs are also stored as part of the virtual stream. When the user records a program (e.g., as part of a scheduled recording or pressing a record button), the program is placed into the same virtual stream. Pairs of start and end pointers identify the beginning and end of the recorded programs in the virtual stream. As programs age with the passage of time, the recorded programs migrate farther downstream in the virtual stream. Over time, there may develop gaps in the stream that contain content which is not part of the recorded program and not part of the pause buffer region of the virtual stream. Such gaps are identified and deleted so that the underlying storage can be reused by the system.

The following discussion is directed to television-based entertainment and information systems, such as interactive TV networks, cable networks that utilize electronic program guides, and Web-enabled TV networks. Client devices in such systems include full-resource clients with substantial memory and processing resources, such as TV-enabled personal computers and digital video recorders equipped with hard disk memories. While the described techniques can be used in any of these systems and for any types of client devices, they are described in the context of the following exemplary environment.

Exemplary System Architecture

Figure 1:
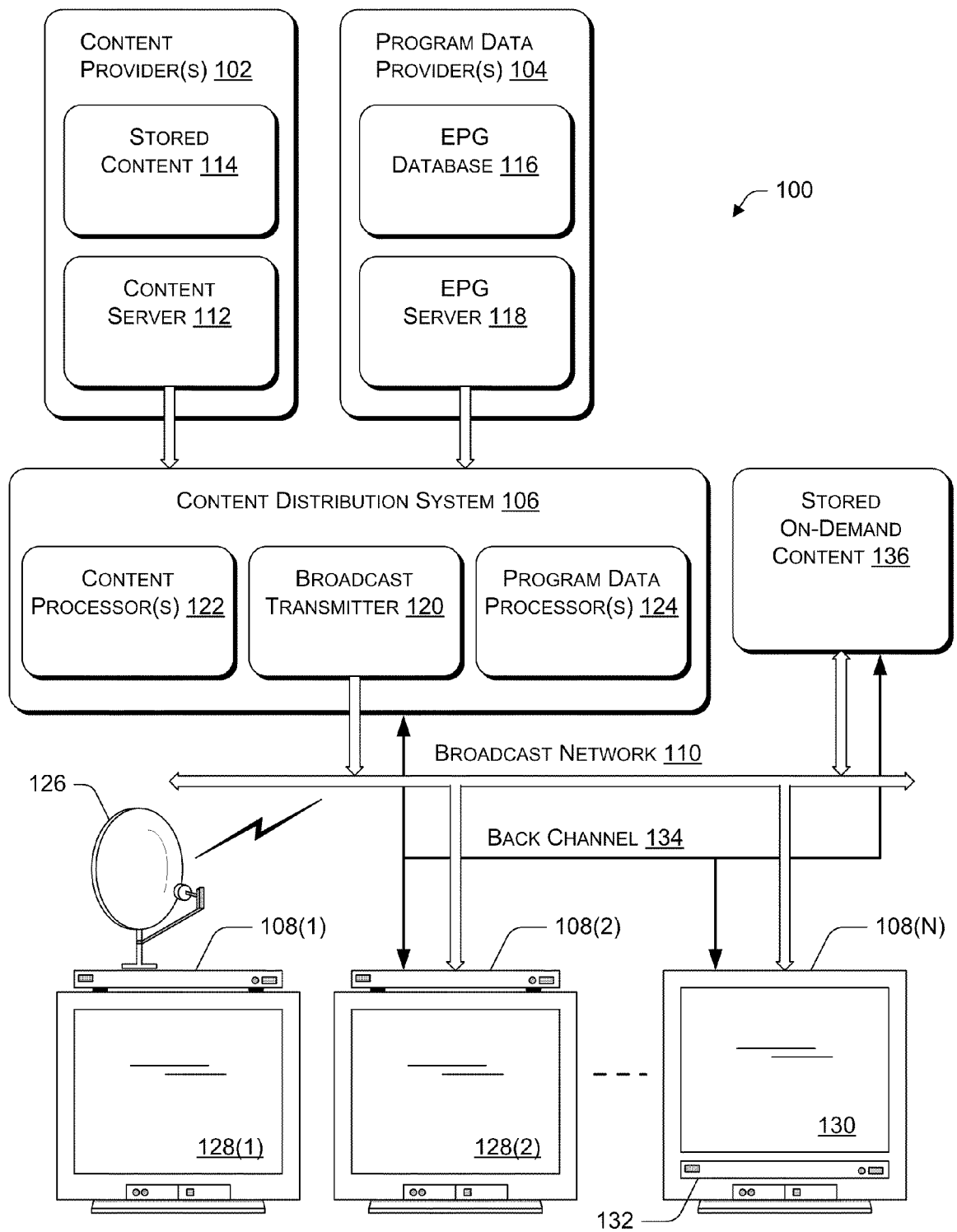
FIG. 1 illustrates an exemplary television entertainment architecture in which the unified recording and pause buffer format can be implemented.

FIG. 1 illustrates an exemplary television entertainment architecture 100 in which the unified recording and pause buffer format can be implemented. Architecture 100 facilitates distribution of content and program data to multiple viewers, and includes one or more content providers 102, one or more program data providers 104, and a content distribution system 106. Multiple client devices 108(1), 108(2), . . . , 108(N) are coupled to the content distribution system 106 via a broadcast network 110.

Content provider 102 includes a content server 112 and stored content 114, such as movies, television programs, commercials, music, and other audio and/or video content. Content server 112 controls distribution of the stored content 114 from content provider 102 to the content distribution system 106. Additionally, content server 112 controls distribution of live content (e.g., content that was not previously stored, such as live feeds) and/or content stored at other locations to the content distribution system 106.

Program data provider 104 includes an electronic program guide (EPG) database 116 and an EPG server 118. The EPG database 116 stores electronic files of program data that is used to generate an electronic program guide (or, "EPG", "program guide"). Program data (or, "EPG data") includes program titles, ratings, characters, descriptions, actor names, station identifiers, channel identifiers, schedule information, and so on. The EPG server 118 processes the program data prior to distribution. The processing may involve any number of techniques to reduce, modify, or enhance the program data. Such processes might include selection of content, content compression, format modification, and the like. The EPG server 118 generates a published version of the program data, which contains programming information for all channels for one or more days. The EPG server 118 controls distribution of the published version of the program data from program data provider 104 to the content distribution system 106 using, for example, a file transfer protocol (FTP) over a TCP/IP network (e.g., Internet, UNIX, etc.). Further, the published version of the program data can be transmitted from program data provider 104 via a satellite directly to a client device, such as device 108(1).

Content distribution system 106 includes a broadcast transmitter 120, one or more content processors 122, and one or more program data processors 124. Broadcast transmitter 120 broadcasts signals, such as cable television signals, across broadcast network 110. Broadcast network 110 can include a cable television network, RF, microwave, satellite, and/or data network, such as the Internet, and may also include wired or wireless media using any broadcast format or broadcast protocol. Additionally, broadcast network 110 can be any type of network, using any type of network topology and any network communication protocol, and can be represented or otherwise implemented as a combination of two or more networks.

A content processor 122 processes the content received from content provider 102 prior to transmitting the content across broadcast network 110. Similarly, a program data processor 124 processes the program data received from program data provider 104 prior to transmitting the program data across broadcast network 110. A particular content processor 122 may encode, or otherwise process, the received content into a format that is understood by the multiple client devices 108(1), 108(2), . . . , 108(N) coupled to broadcast network 110. Although FIG. 1 shows a single content provider 102, a single program data provider 104, and a single content distribution system 106, the exemplary architecture 100 can include any number of content providers and/or program data providers coupled to any number of content distribution systems.

Content distribution system 106 is representative of a headend service, or network operator, which provides EPG data, as well as content, to multiple subscribers. Each content distribution system 106 may receive a slightly different version of the program data that takes into account different programming preferences and lineups. The EPG server 118 creates different versions of EPG data (e.g., different versions of a program guide) that include those channels of relevance to respective headend services, and the content distribution system 106 transmits the EPG data to the multiple client devices 108(1), 108(2), . . . , 108(N). In one implementation, for example, content distribution system 106 utilizes a carousel file system to repeatedly broadcast the EPG data over an out-of-band (OOB) channel to the client devices 108.

Client devices 108 can be implemented in a number of ways. For example, a client device 108(1) receives broadcast content from a satellite-based transmitter via a satellite dish 126. Client device 108(1) is also referred to as a set-top box or a satellite receiving device. Client device 108(1) is coupled to a television 128(1) for presenting the content received by the client device (e.g., audio data and video data), as well as a graphical user interface. A particular client device 108 can be coupled to any number of televisions 128 and/or similar devices that can be implemented to display or otherwise render content. Similarly, any number of client devices 108 can be coupled to a single television 128.

Client device 108(2) is also coupled to receive broadcast content from broadcast network 110 and provide the received content to associated television 128(2). Client device 108(2) is representative of a standalone cable set-top box. Client device 108(N) is an example of a combination television 130 and integrated set-top box 132. In this example, the various components and functionality of the set-top box are integrated into the television, rather than using two separate devices. The set-top box integrated into the television can receive broadcast signals via a satellite dish (similar to satellite dish 126) and/or via broadcast network 110. In alternate implementations, client devices 108 may receive broadcast signals via the Internet or any other broadcast medium, such as back channel 134 which can be implemented as an Internet protocol (IP) connection using a modem connection and conventional telephone line, for example. Further, back channel 134 provides an alternate communication link between each of the client devices 108, and between the client devices 108 and the content distribution system 106.

Each client device 108 can run an electronic program guide (EPG) application that utilizes the program data. An EPG application enables a television viewer to navigate through an onscreen program guide and locate television shows and other broadcast content of interest to the viewer. With an EPG application, the television viewer can look at schedules of current and future programming, set reminders for upcoming programs, and/or enter instructions to record one or more television shows.

One or more of the client devices 108 are also equipped with functionality to operate as a digital video recorder (DVR). These devices include a hard disk memory or other type of permanent storage and a DVR application that manages recordation of programs on the memory as well as pause buffer functionality. The DVR application employs a unified format that integrates recorded programs and paused broadcasts within a common virtual stream on the disk memory. This is described below in more detail.

The exemplary architecture 100 also includes stored on-demand content 136, such as Video On-Demand (VOD) movie content. The stored on-demand content can be viewed with a television 128 via a client device 108 through an onscreen movie guide, for example, and a viewer can enter instructions to stream a particular movie, or other stored content, down to a corresponding client device 108.

Exemplary Client Device with DVR Functionality

Figure 2:
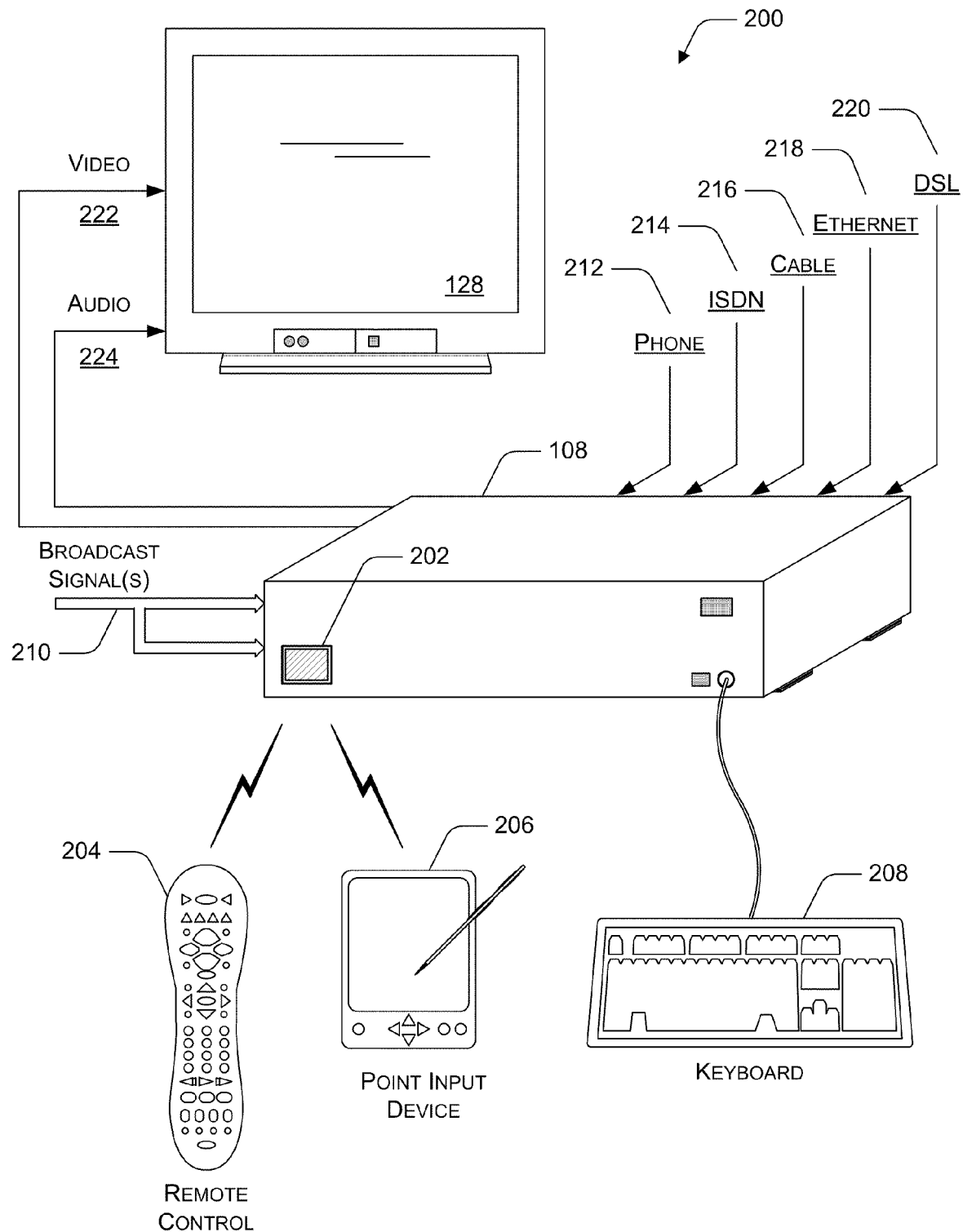
FIG. 2 illustrates an example client device, a television, and various input devices that interact with the client device.

FIG. 2 illustrates an exemplary implementation 200 of a client device 108 shown as a standalone unit that connects to a television 128. Client device 108 can be implemented in any number of embodiments, including as a set-top box, a satellite receiver, a TV recorder with a hard disk, a digital video recorder (DVR) and playback system, a game console, an information appliance, and so forth.

Client device 108 includes a wireless port 202, such as an infrared (IR) or Bluetooth wireless port, for receiving wireless communications from a remote control device 204, a handheld input device 206, or any other wireless device, such as a wireless keyboard (not shown). Handheld input device 206 can be a personal digital assistant (PDA), handheld computer, wireless phone, or the like. Additionally, a wired keyboard 208 can be coupled to communicate with client device 108. In alternate embodiments, remote control device 204, handheld device 206, and/or keyboard 208 may use an RF communication link or other mode of transmission to communicate with client device 108.

Client device 108 receives one or more broadcast signals 210 from one or more broadcast sources, such as from a satellite or from a broadcast network, such as broadcast network 110 (FIG. 1). Client device 108 includes hardware and/or software for receiving and decoding broadcast signal 210, such as an NTSC, PAL, SECAM, or other TV system video signal. Client device 108 also includes hardware and/or software for providing the user with a graphical user interface by which the user can, for example, access various network services, configure the client device 108, and perform other functions.

Client device 108 can communicate with other devices via one or more connections including a conventional telephone line 212, an ISDN link 214, a cable link 216, an Ethernet link 218, a DSL link 220, and the like. Client device 108 may use any one or more of the various communication links 212-220 at a particular instant to communicate with any number of other devices.

Client device 108 generates video signal(s) 222 and audio signal(s) 224, both of which are communicated to television 128. The video signals and audio signals can be communicated from client device 108 to television 128 via an RF (radio frequency) link, S-video link, composite video link, component video link, or other communication link. Although not shown in FIG. 2, client device 108 may include one or more lights or other indicators identifying the current status of the device. Additionally, the client device may include one or more control buttons, switches, or other selectable controls for controlling operation of the device.

Client device 108 is also equipped with a hard disk memory and functionality to operate as a digital video recorder. The client device 108 can record programs received as a broadcast signal 210, or received over other communication connections, such as cable 216 and DSL 220. The client device 108 is able to record these programs and additionally pause and resume the live broadcasts of these programs. The device 108 stores the scheduled recordings and paused broadcasts in a unified format as a single virtual stream. As content is received on a channel, it is added to the virtual stream to create an arbitrary-length stream of historically-aged content, where newer content is nearer to the front of the stream and older content is downstream. Currently received content is stored at the front of the stream. In this manner, the front region of the stream forms a pause buffer. As the new content ages beyond a period suitable for temporarily paused content (e.g., 30 minutes, 60 minutes, 90 minutes, etc.), the content can either be marked as a recording and saved indefinitely or reclaimed by the system.

Figure 3:
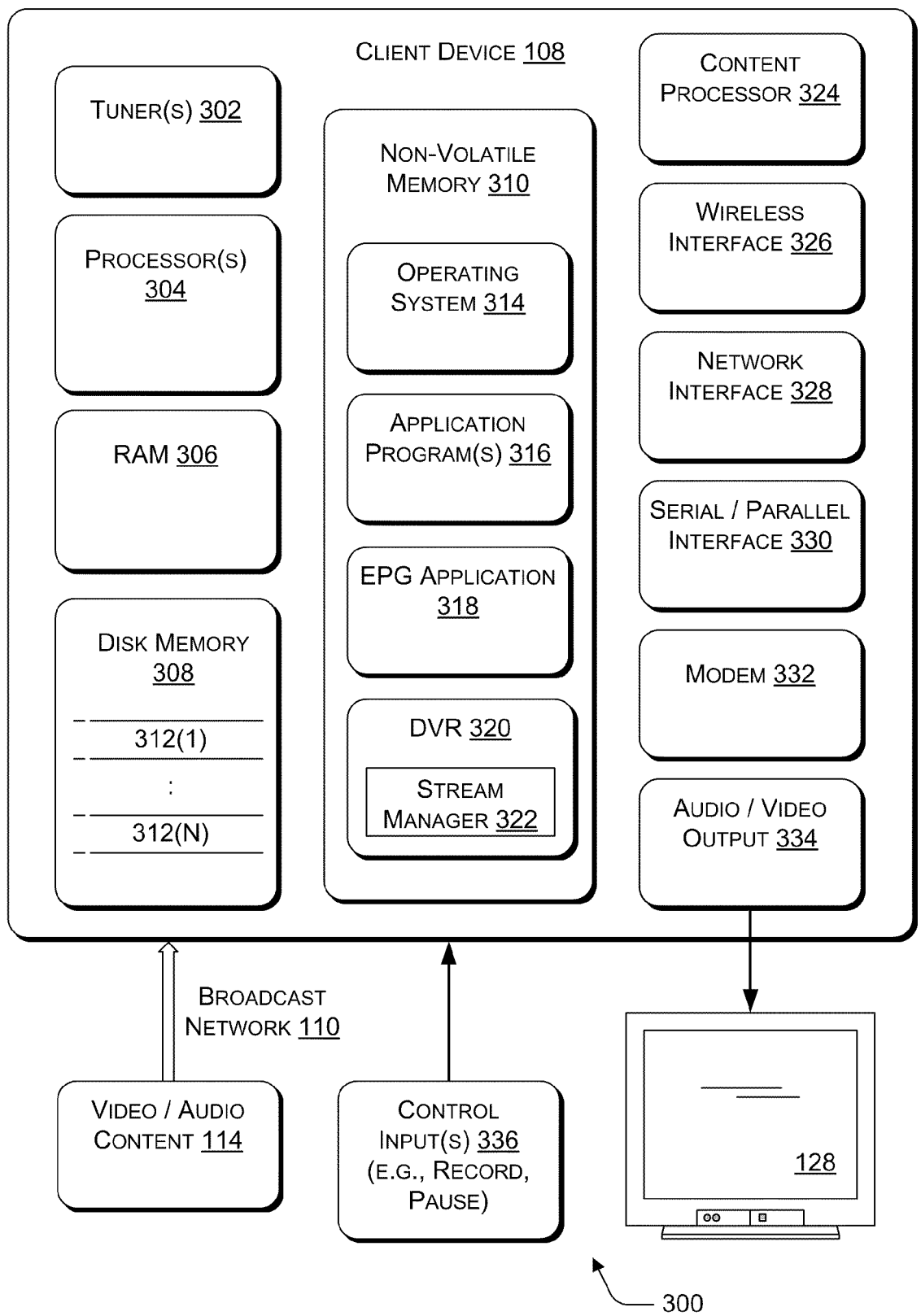
FIG. 3 illustrates the client device implemented as part of a digital video recording system that stores recorded programs and paused broadcast programs within a unified virtual stream.

FIG. 3 illustrates components of the client device 108 in more detail. The client device 108 is shown within the context of an exemplary digital video recording system 300 that includes selected components of television architecture 100, such as the client device 108, a television 128, and audio/video content 114 received from the content providers via broadcast network 110. Client device 108 includes components to implement a digital video recording system that stores both the scheduled recordings and paused programs in a unified format.

Client device 108 includes one or more tuners 302 which are representative of one or more in-band tuners that tune to various frequencies or channels to receive broadcast television signals, as well as an out-of-band tuner that tunes to the broadcast channel over which the EPG data is broadcast to client device 108. One or more processors 304 process various instructions to control the operation of the client device 108 and to communicate with other electronic and computing devices.

Client device 108 can be implemented with one or more memory components, examples of which include a random access memory (RAM) 306, a hard disk memory 308, and a non-volatile memory 310 (e.g., ROM, Flash, EPROM, EEPROM, etc.). The memory components (e.g., RAM 306, disk memory 308, and non-volatile memory 310) store various information and/or data such as received content, EPG data, configuration information for client device 108, and/or graphical user interface information.

Disk memory 308 stores recorded programs and paused content as one or more virtual streams, represented by unbounded streams 312(1), . . . , 312(N). Each virtual stream 312 is able to continuously record the programming being received on a channel to which a tuner 302 is tuned. Each stream has a beginning point at which a live broadcast is stored. The stream can be further characterized as having no defined length; rather, the stream length is arbitrarily long. Each stream can be considered virtual in that the programming content within the stream need not be stored in contiguous memory locations in disk memory 308, but instead can be dispersed throughout the disk and yet still be logically part of the same stream.

A front section of the stream forms a pause buffer. This pause buffer region can be defined to store, or otherwise maintain, any measure of content that can be based on a time value or a quantity value. As an example, the pause buffer may be defined as any content that has been recorded within the last N minutes (e.g., 30, 60, 90 minutes), or as the most recently recorded content that does not exceed some threshold amount of storage. The pause buffer region is identified in the stream by a pair of start and end pointers, similar to a recording. The start pointer is always pegged to the front end of the stream and the end pointer moves according to product defined constraints.

Recorded programs are also stored as part of the virtual streams 312(1)-312(N). A recording is identified by a pair of pointers or other references into the stream to set off the beginning and end of the recording. Content in the stream that does not fall within a recording and is not part of the pause buffer (e.g. content that is past 90 minutes, but not in a recorded program) can be reclaimed by the system. Thus, in general, within the sparse stream, older data is referred to by one or more recordings and newer data is the active portion of the pause buffer. However, a recent or active recording can overlap with the boundaries of the current pause buffer. Thus, there is no separation or differentiation between recordings and pause buffer, as there is one unified representation or format for both on the disk memory.

In one implementation, the device may be configured to create and manage one virtual stream. Alternatively, the device may create and manage multiple virtual streams, such as one virtual stream per one channel or per a collection of channels.

An operating system 314 and one or more application programs 316 can be stored in non-volatile memory 310 and executed on a processor 304 to provide a runtime environment. A runtime environment facilitates extensibility of client device 108 by allowing various interfaces to be defined that, in turn, allow application programs 316 to interact with client device 108. Examples of possible application programs 316 include a browser to browse the Web (e.g., "World Wide Web"), an email program to facilitate electronic mail, and so on. An EPG application 318 is stored in memory 310 to operate on the EPG data and generate a program guide.

A DVR component 320 is also shown implemented as software stored in memory 310 and executed by processor 304. The DVR component 320 facilitates digital video recording of the broadcast content 114 onto into one of the streams 312(1)-312(N) on disk memory 308. The DVR component 320 supports scheduled recording of programs based, for example, on the EPG data provided by EPG application 318 or by user entered time and channel scheduling. Additionally, the DVR component 320 supports user-initiated recording in response to a user command. The DVR 320 also supports pause/resume functionality that allows the viewer to pause a live broadcast and later resume viewing the broadcast from the paused point, while the broadcast is still in progress. The DVR component 320 facilitates subsequent playback of the content from the streams 312(1)-312(N), as well as shuttle commands such as fast forward, rewind, skip, and so forth.

The DVR component 320 includes a stream manager 322 to create and manage the virtual streams 312(1)-312(N). The stream manager 322 also maintains reference mappings to identify the various programs contained in virtual streams. The stream manager 322 is described below in more detail with reference to FIG. 4.

Client device 108 can also include other components pertaining to a television entertainment system which are not illustrated in this example. For instance, client device 108 can include a user interface application and user interface lights, buttons, controls, and the like to facilitate viewer interaction with the device.

Client device 108 also includes a content processor and/or decoder 324 to process and decode a broadcast video signal, such as an NTSC, PAL, SECAM, or other TV system video signal. Content processor 324 can also include a video decoder and/or additional processors to receive, decode, and/or process video content received from the content distribution system (e.g., a network operator) over broadcast network 110. For example, content processor 324 may include an MP3 or MPEG-2 (Moving Pictures Experts Group) decoder that decodes MPEG-encoded video and advertisement content. MPEG-2 supports a variety of audio/video formats, including legacy TV, HDTV (high-definition television), DVD (digital versatile disc), and five-channel surround sound.

Typically, video content includes video data and audio data that corresponds to the video data. Content processor 324 generates video and/or display content that is formatted for display on display device 128, and generates decoded audio data that is formatted for broadcast by a broadcast device, such as one or more speakers (not shown). Content processor 324 can include a display controller (not shown) that processes the video and/or display content to display corresponding images on display device 128. A display controller can include a microcontroller, integrated circuit, and/or similar video processing component to process the images. It is to be appreciated that the techniques described herein can be implemented for any type of encoding format as well as for data and/or content streams that are not encoded.

Client device 108 further includes a wireless interface 326, a network interface 328, a serial and/or parallel interface 330, and a modem 332. Wireless interface 326 allows client device 108 to receive input commands and other information from a user-operated input device, such as from a remote control device or from another IR, Bluetooth, or similar RF input device.

Network interface 328 and serial and/or parallel interface 330 allows client device 108 to interact and communicate with other electronic and computing devices via various communication links. Although not shown, client device 108 may also include other types of data communication interfaces to communicate with other devices. Modem 332 facilitates communication with other electronic and computing devices via a conventional telephone line. Client device 108 also includes an audio and/or video output 334 that provides signals to television 128 or to other devices that process and/or display, or otherwise render, the audio and video data.

Client device 108 receives viewer commands as control inputs 336 from such viewer-operated devices as remote control device 204, handheld device 206, and/or keyboard 208 (See FIG. 2). The viewer inputs can include commands for DVR operation, such as record, pause/resume, fast-forward, rewind, play, and the like. The input commands may be input via an RF, IR, Bluetooth, or similar communication link or other mode of transmission.

Although shown separately, some of the components of client device 108 may be implemented in an application specific integrated circuit (ASIC). Additionally, a system bus (not shown) can be used to connect the various components within client device 108. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Unified Format

Figure 4:
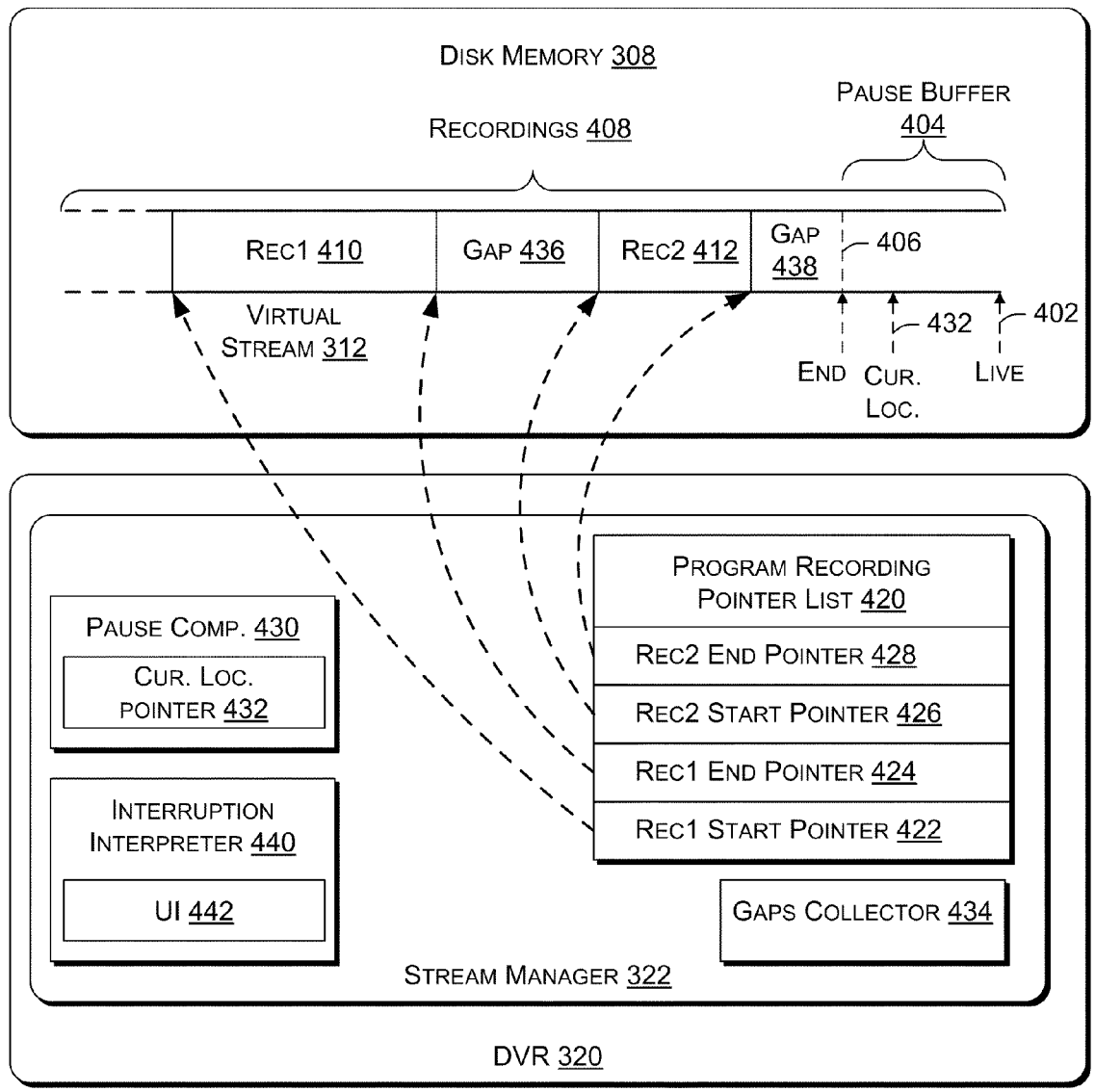
FIG. 4 illustrates components of the digital video recording system of FIG. 3 to demonstrate how recorded programs and paused broadcasts are stored in a unified format within a data structure.

FIG. 4 illustrates how recorded programs and paused broadcasts are stored in a unified format. For ease of discussion, a single virtual stream 312 is shown stored in disk memory 308. The stream 312 has a beginning point referenced by a "live" pointer 402. Content received on a channel is stored in the stream 312 at the live pointer 402. As time progresses and the stream grows, aging content is found increasingly farther downstream from the front region of the stream where live broadcasts are being recorded. Thus, the stream 312 can be characterized as history of recorded content, with current content at the right-hand side of the stream (in the FIG. 4 illustration) and increasingly older content extending to the left-hand side of the stream. The stream 312 has no defined length (as represented by the dashed lines extending the stream to the left in FIG. 4); rather the stream 312 is arbitrarily long.

A front section of the stream functions as a pause buffer 404. This pause buffer region of the stream contains the most recently captured content from a current channel. Since the pause buffer is part of the larger stream, it can be of any arbitrary size. The buffer size can be set during manufacturing or configured by the user. The size may be based on time (e.g., 30 or 60 minutes of content) or quantity of data or it can be dynamic, varying in size based on the amount of physical free space. A dashed line 406 illustrates a conceptual boundary of the pause buffer 404, but this boundary does not exist from a storage management viewpoint and is merely there for illustration purposes. With the unified format, there is no longer any barrier or separation between what constitutes content in a pause buffer and content in a recording. An accompanying pause buffer end pointer 407 is provided to mark the end of the pause buffer region 404. The live and end pointers 402 and 407 are dynamic relative to the content in the stream, whereby they move to continually identify the most recent pre-defined amount of content that is captured at the start of the stream.

The stream also functions as persistent storage for recorded programs 408 that a user desires to maintain for a longer duration (or perhaps indefinitely) and playback at a later time. Initially, when a program is being recorded as part of a scheduled recording or in response to viewer activation of a record button, the program is recorded at the front of the stream in the pause buffer region 404, beginning at the live pointer 402. Thus, if the viewer is watching, she may use pause/resume functions on the same program that is being persistently recorded for later playback. With a recording, start and end pointers are used to identify the recording in the virtual stream 312. After the program is recorded, and newer content is subsequently stored in the stream, the recorded program migrates downstream. In FIG. 4, two programs are shown recorded and maintained in the stream 312: a first recording (Rec1) 410 and a second recording (Rec2) 412. The first recording 410 is of longer duration and older than the second recording 412. Since a recording may reside anywhere in the stream (including the pause buffer region 404), FIG. 4 illustrates this concept by showing the recordings region 408 overlapping with the pause buffer region 404.

Stream manager 322 creates the stream 312 and manages the content stored in the stream. The stream manager 322 includes a pointer list 420 that contains pairs of start and end pointers which identify the beginning and end of recorded programs in the virtual stream 312. In this illustration, there are two pairs of pointers for the two recorded programs 410 and 412. A start pointer 422 and an end pointer 424 identify the beginning and end of the first recording 410 and a start pointer 426 and an end pointer 428 identify the beginning and end of the second recording 412.

The stream manager 322 may also be configured with a pause component 430 to manage the pause buffer 404. The pause component 430 uses a current pointer 432 to point to the location in the stream that is currently being displayed. Thus, as the viewer is watching live broadcast, the current pointer 432 coincides with the live pointer 402. When a user pauses a broadcast, the pointer 432 stops moving at that point in the program, while the device continues to capture the broadcast. When the user wishes to resume, playback begins at the current pointer 432. Shuttle controls such as fast forward and rewind move the current pointer forward and backward at appropriate speeds.

The stream manager 322 further includes a gaps collector 434 to remove content that is not part of a recording and is no longer in the pause buffer 404. In FIG. 4, representative gaps 436 and 438 are shown in the stream 312. The gaps collector 434 can be implemented as a background process that analyzes the disk memory 308 for any content that is not part of a recording and not in the pause buffer. Once a gap is identified, any underlying physical memory can be reclaimed as free and available for reuse by the system.

Channel changes, power outages, and other disruptions may cause interruptions to the broadcast stored in the pause buffer region 404. In some cases, the viewer may not readily understand why there is a break in the broadcast when resuming play of the broadcast from the pause buffer after a pause event. Accordingly, the stream manager 322 may further include an interruption interpreter 440 that determines the reason for the interruption. For example, the interpreter 440 ascertains whether the break in the paused broadcast is the result of a channel change, a power outage, loss of distribution service, and or other situation. The interpreter 440 may then present an explanation within a user interface 442 to inform the user of why the broadcast was interrupted.

The arbitrary-length virtual stream 312 is thus a data structure stored in hard disk memory that logically associates audio and/or video data of various programs. The data structure includes a pause buffer region at which new content is captured, but essentially treats recordings and the pause buffer in the same way, with both being identified by pointers. The pause buffer region is defined by dynamic start and end pointers that move relative to the content as content is captured, while the recordings are defined by start and end pointers that are fixed to the start and end of the program. Over time, the data structure defines an arbitrarily long virtual stream that is sparsely filled with recordings and maintains a pause buffer region for recently captured content. The number of recordings that can be maintained in the virtual stream is bounded by the capacity of the disk storage. The lack of barrier between what is considered a recording and what is considered the pause buffer provides for an improved user experience, as will be discussed below with reference to the scenarios of FIGS. 5-9.

Several scenarios of how the stream manager 322 manages the streams of content on the disk memory are described below with reference to FIGS. 5-9. These are merely examples to demonstrate the flexibility and usefulness of the unified format, and are not intended to be exhaustive.

Figure 5:
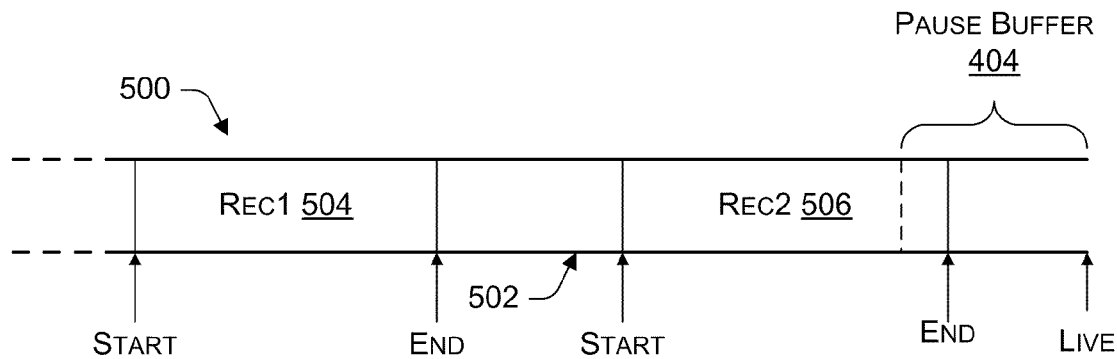
FIGS. 5-9 show exemplary scenarios for storing recordings and paused broadcasts within a common virtual stream.

FIG. 5 shows a scenario 500 where a pause buffer can refer back into a recording. Here, a virtual stream 502 has a first recording (Rec1) 504 and second recording (Rec2) 506. The second recording 506 overlaps with the pause buffer region 404 of the stream 502, as represented by the end pointer for Rec2 506 being within region 404. This is the case, for example, when the DVR system recently ended recording a program less than the time duration of the pause buffer (e.g., the recording completed less than 90 minutes ago).

Since there is no distinction in the virtual stream as to paused content and recorded content, the viewer is able to move back and forth between a recently recorded program and the pause buffer content. For instance, suppose a viewer is recording one program on the channel (e.g., Rec2 506) and that program recording ends. Further, suppose the viewer decides to rewind and view a portion of the recording, regardless of whether or not the viewer is aware that the recording has ended. With the unified format, the user can easily rewind into the recorded program and watch the desired portion of that recorded program. In contrast, previous DVR systems would have created a standalone pause buffer for recent content after the recording ended, and the viewer would not have been able to rewind into the recording. Instead, the viewer would probably need to locate the recording (e.g., via a user interface (UI)) and then use move through the recording to locate the desired portion. Thus, the unified format offers a natural and easy way to move back and forth across a boundary between a recording and a pause buffer that existed in previous DVR systems.

Figure 6:
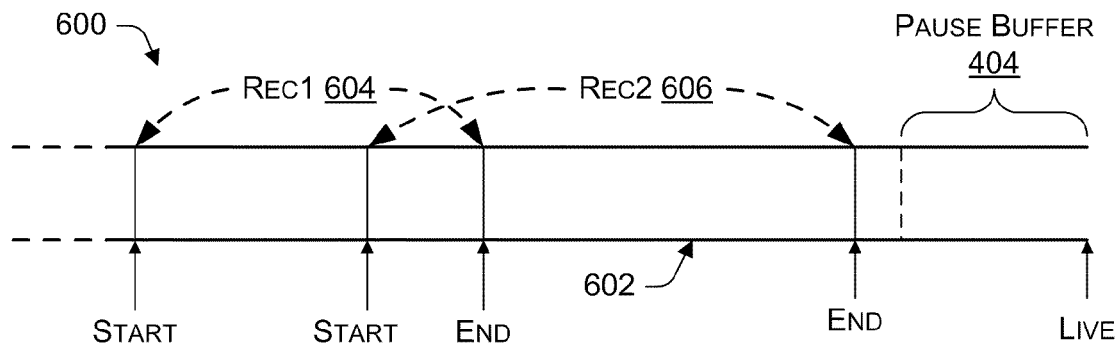

FIG. 6 shows a scenario 600 where overlapping recordings on the same channel are also managed without causing conflicts. In scenario 600, a virtual stream 602 has a first recording (Rec1) 604 that overlaps with a second recording (Rec2) 606. This may occur, for example, where a user records a sporting event and the next scheduled program on the same channel, and the sporting event extends beyond the scheduled timeslot. With the unified format that treats recordings as data in a common virtual stream, these situations of overlapping recordings on the same channel are handled to provide an intuitive experience for the user. The start and end pointers reference the programs in the stream, and readily accommodate the overlapping recordings.

Figure 7:
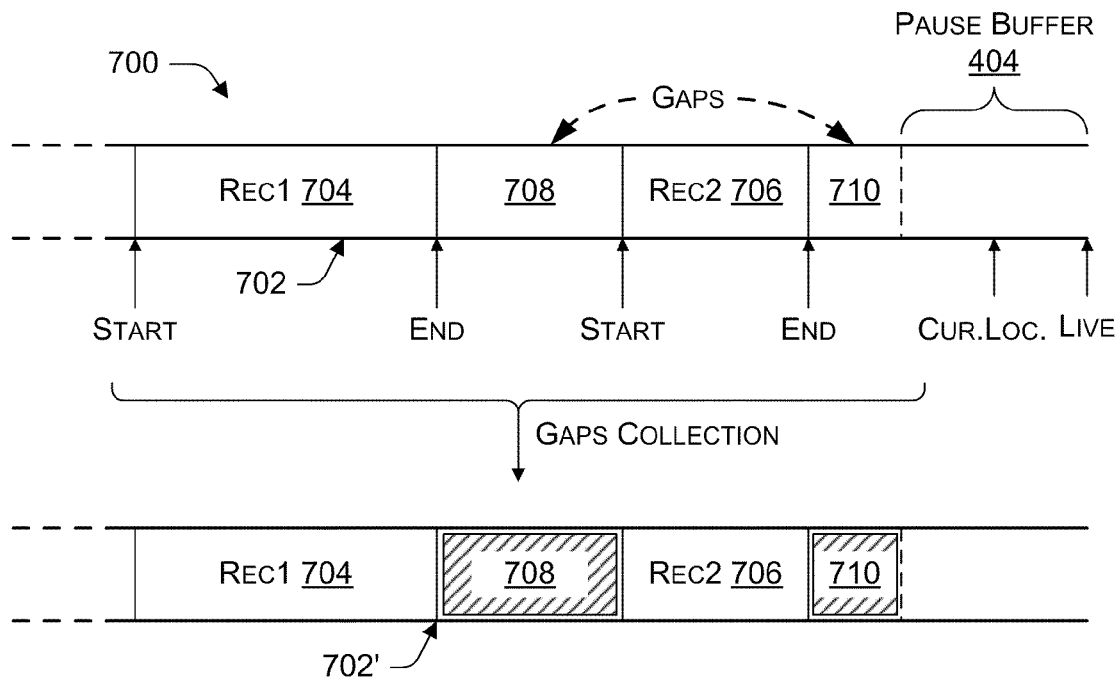

FIG. 7 shows a scenario 700 where gaps between recordings are examined to determine if they still reference physical storage space that can be freed up for additional recordings. In this scenario, a virtual stream 702 has a first recording (Rec1) 704 and a second recording (Rec2) 706. The stream 702 also has gaps 708 and 710 that reference physical memory that is currently storing content which is not part of a recording and not in the pause buffer 404. The gaps collector 434 (FIG. 4) is invoked to identify such gaps and reclaim the underlying physical storage space. As shown, the gaps collector 434 identifies the gaps 708 and 710 as referencing physical storage space and reclaims the physical storage space referenced by the gaps. This is reflected in post-collection stream 702' by addition of a hashing pattern in gaps 708 and 710 to illustrate that it no longer references physical memory. Additionally, the system may use a similar technique to reclaim storage space associated with recordings in the stream that are subsequently deleted by the user.

As one exemplary technique, reference counts may be used to manage the data in the stream. Regions of the stream can be assigned different counts depending upon whether the region is part of a stream and still in use as part of a recording, or whether it is a gap or a deleted recording and thus free to be reclaimed. For instance, suppose a region that is part of a recording is assigned a count of "1" and a region that is referenced by two recordings is assigned a count of "2", and so forth. Additionally, the pause buffer region is assigned a count of "1". Other regions that form gaps (i.e., not part of a recording or pause buffer) are assigned a count of "0". When a recording is deleted or content leaves the pause buffer region without being part of a recording, the reference count is decremented. When the count reaches "0", the gaps collector will identify the regions and determine whether the regions reference underlying physical storage. If so, the gaps collector marks the physical storage as "free" for reuse by the system.

Figure 8:
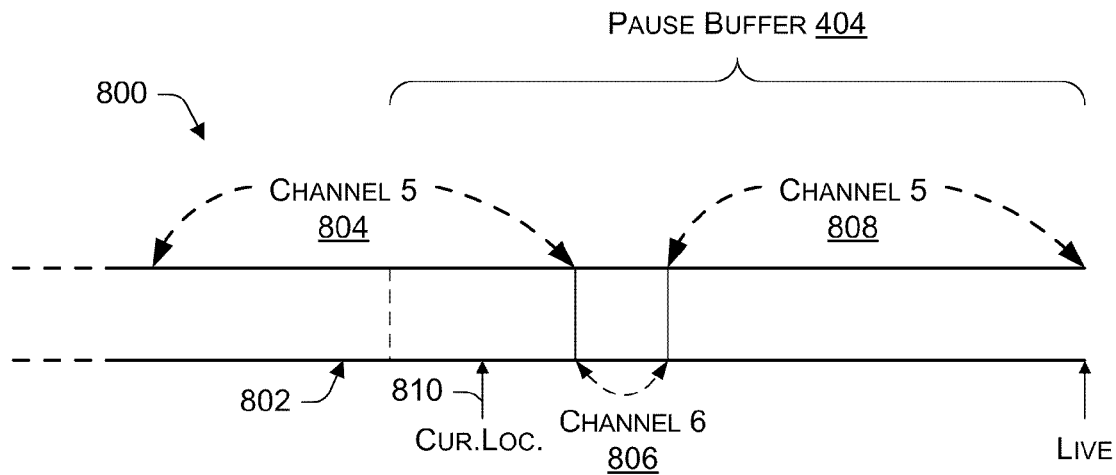

FIG. 8 shows a scenario 800 where a user changes channels (accidentally or intentionally) without losing or flushing all of the previous content in the pause buffer. In this scenario, a viewer is watching channel 5, briefly switches channels to channel 6, and then returns to channel 5. In FIG. 8, the pause buffer region 404 is enlarged to illustrate this scenario. When the viewer is watching channel 5, content from that channel is recorded into a virtual stream 802, as represented by a segment 804 of the stream. When the viewer changes to channel 6, content from that channel is recorded into the virtual stream 802, as represented by a segment 806 of the stream. Finally, when the viewer returns to channel 6, the content from that channel is again recorded in the stream 802, as represented by a segment 808.

With this unified format, the viewer is able to return to the content in segment 804 prior to the channel change using pause buffer functionality. For instance, the viewer might return to location 810 in the stream 802. Since the content is persistent in the stream 802 until recycled via a gaps collection process, the content is not flushed or deleted upon the channel change, as in prior conventional DVR systems. Therefore, the DVR system can return the user to point 810 and begin playing back the content in the pause buffer.

However, when the viewer encounters segment 806 on the playback, it will show the content from channel 6. This may be confusing to the viewer. To provide assistance in this situation, the system presents a UI to inform the viewer that the brief transition to channel 6 is the result of a channel change, and that the content on channel 5 for that segment was therefore not captured.

Additionally, interruptions in the stream may occur for reasons other than channel change. For example, a similar interruption may occur during unexpected power loss while recording. When the power is restored and the system begins recording, there will be a segment of content missing from the virtual stream. In this case, the UI explains that the loss of data in the playback was caused by power loss. Other possible conditions might be loss of distribution network, technical difficulties at the content providers, and so forth.

Figure 9:
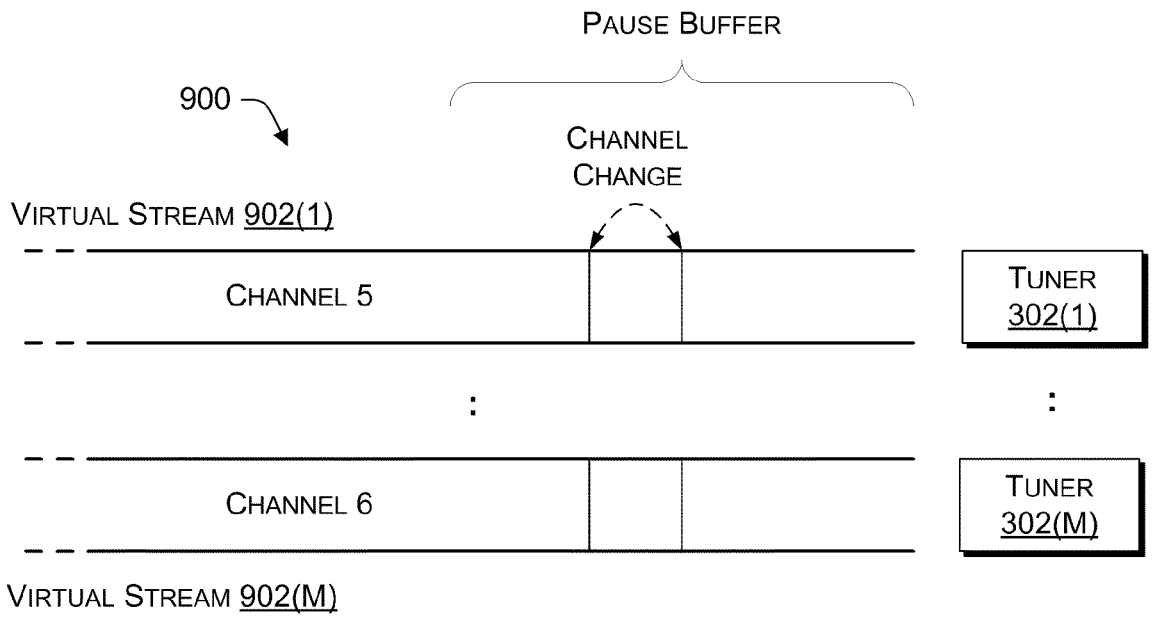

FIG. 9 shows another implementation scenario 900 where the stream manager 322 creates multiple virtual streams. For instance, the stream manager may create one stream for each channel or group of channels. The scenario described above with respect to FIG. 8 would then be handled by placing content from channel 5 in one stream and content from channel 6 in a second virtual stream.

In another implementation, the system may be equipped with multiple tuners. One or more virtual streams may then be created and used to support the multiple tuners. In this example, one virtual stream 902(1), ..., 902(M) is created for each tuner 302(1), ..., 302(M), although other configurations are possible. With this arrangement, channel changes may not cause interruptions in the stream if one of the tuners is available. For example, suppose the viewer is watching channel 5 on tuner 302(1). The content from channel 5 is being recorded into virtual stream 902(1). When the viewer changes to channel 6, a second tuner 302(M) can tune to channel 6 and begin displaying the content on channel 6. Additionally, the content can be recorded into second virtual stream 902(M). At the same time, the first tuner 302(1) can continue to record content on channel 5 into virtual stream 902(1). If the viewer subsequently returns to channel 5 and wishes to playback what he missed while on channel 6, the viewer can use pause/resume functions to playback from the missed content from channel 5 in virtual stream 902(1).

Method for Content Buffer Management

Figure 10:
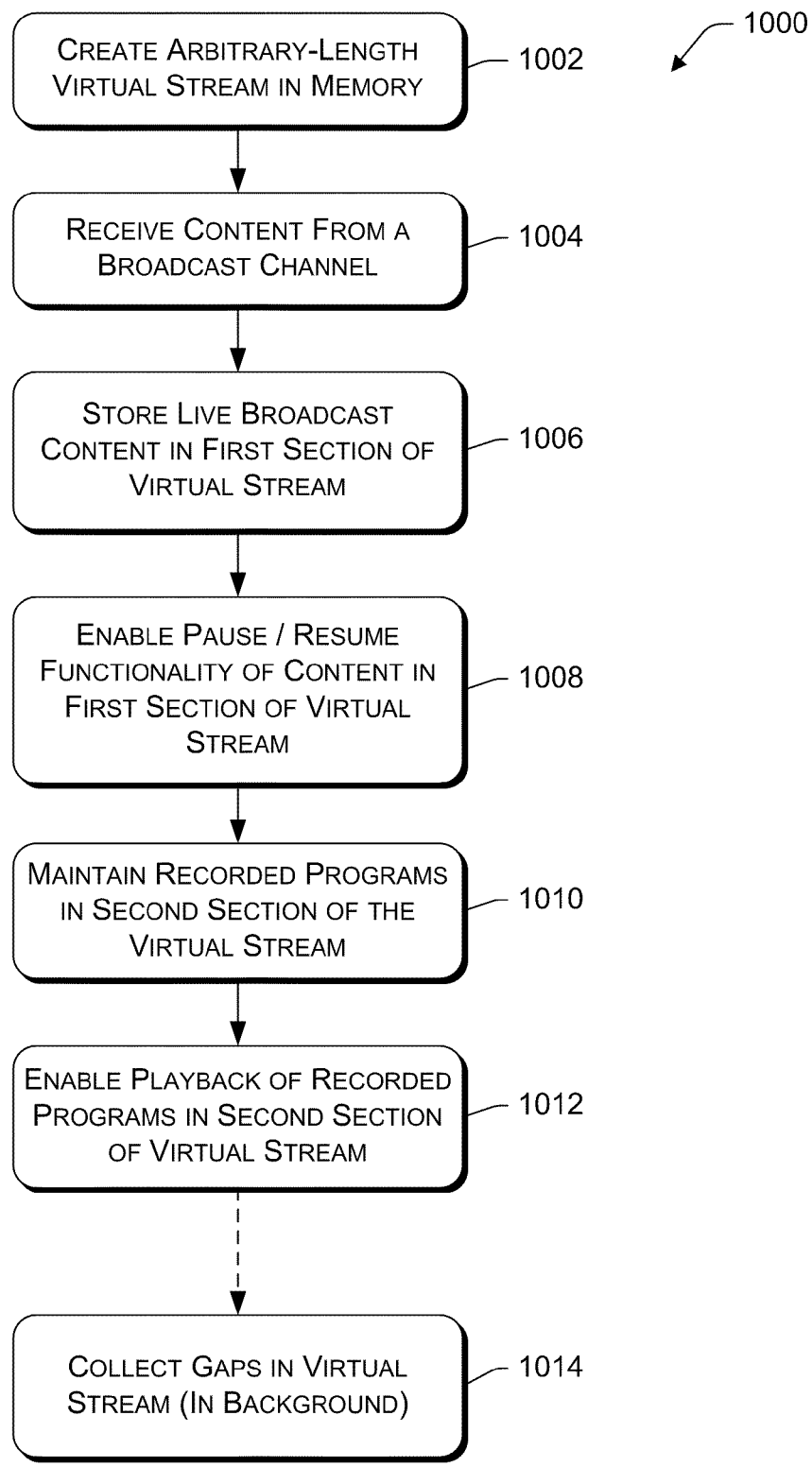
FIG. 10 is a flow diagram that illustrates a process for operating a digital video recording system such that recorded programs and paused broadcasts are stored in a unified format.

FIG. 10 shows a process 1000 for operating a digital video recording system such that recorded programs and paused broadcasts are stored in a unified format. The process 1000 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order to implement the process.

For discussion purposes, the process 1000 is described with reference the system 300 of FIG. 3 and the DVR aspects described with reference to FIG. 4. It is noted that the process 1000 may be implemented by other system architectures.

At block 1002, an arbitrary-length virtual stream is created. As one example, the stream manager 322 establishes a stream 312 in hard disk memory 308 and provides an initial live pointer 402 to identify the beginning of the stream (FIG. 4). At block 1004, content is received from a broadcast channel. The tuner 302 tunes to a particular channel on the broadcast network, and the content is received at the device 108.

At block 1006, the live broadcast content is stored in a first section of the virtual stream. In the described implementation of FIG. 4, the broadcast program being received on the current channel is stored in the pause buffer region 404 of the stream 312, starting at the live pointer 402. At block 1008, a user is enabled to pause and resume playback of the broadcast content stored in the pause buffer region 404 of the virtual stream. When a user pauses a current broadcast, a current location pointer stops as more recent content continues to be captured in the stream. When the user resumes play, the device continues play beginning at the current location pointer, while the broadcast continues to be recorded into the pause buffer region 404 at the live pointer 402. The user can also use shuttle commands to skip, rewind, etc. within the paused content.

Programs stored as part of a recording operation (e.g., scheduled recording, one-touch recording, etc.) are likewise initially placed in the pause buffer region of the virtual stream in the same manner that broadcast content is recorded. The pause/resume functionality (and fast forward, rewind, etc.) can be applied to this recorded content in the pause buffer region 404 in the same manner as the currently captured live programming that is not part of a recorded program. The recorded programs are identified via pointers and retained indefinitely in the virtual stream. Thus, as content ages, the recorded program moves through this pause buffer region and is maintained downstream in a second section of the virtual stream outside the pause buffer region (block 1010). As shown in FIG. 4, as recorded content ages beyond the constraints of the pause buffer (e.g., exceeds a size threshold or is longer than a temporal threshold), it continues to be held in the recording section 408 of the virtual stream 312 outside of the pause buffer region 404. The stream manager 322 maintains a list of pointers that identify the start and end points of the recorded programs in the virtual stream 312. At block 1012, the user is enabled to playback selected ones of the recorded programs in the second section of the virtual stream. As one example, the device presents a UI that allows the user to browse the recorded programs stored in disk memory 308, and choose a program for playback. Once selected, the stream manager 322 retrieves the corresponding start pointer and locates the start of the requested program. The program is then played back.

As noted above, content that is not part of a recorded program or still in the pause buffer region of the virtual stream can be systematically examined and if referencing physical storage, that physical storage can be reclaimed by the system. At block 1014, a background process may be executed to identify and collect these gaps that reference storage space, and free up space on the hard disk memory that can be reused by the system. In one implementation, the gaps reclamation process is performed by the gaps collector 434 as a background process run by the stream manager 322 (FIG. 4).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
storing in memory as a single virtual stream, a plurality of recorded programs together with content from a currently tuned broadcast program, the content from the currently tuned broadcast program stored in a front section of the single virtual stream, the front section of the single virtual stream effectively operable as a pause buffer, wherein references to an ending point of a first recorded program of the plurality of recorded programs and a starting point of a second recorded program of the plurality of recorded programs overlap within the single virtual stream to accommodate a portion of the first recorded program that was broadcast during a time period for the second recorded program;
enabling a user to pause and resume play of the content in the pause buffer; and
enabling the user to playback at least one of the first recorded program or the second recorded program from the single virtual stream, wherein the first recorded program and the second recorded program are recordings of different program content.

2. A method as recited in claim 1, wherein the first recorded program and the second recorded program are initially stored in the single virtual stream as part of the pause buffer.

3. A method as recited in claim 1, further comprising identifying the first recorded program and the second recorded program within the single virtual stream via references to starting and ending points of each of the first recorded program and the second recorded program.

4. A method as recited in claim 1, further comprising identifying content in the single virtual stream that is not part of the plurality of recorded programs and is not part of the pause buffer and reclaiming any storage space associated with the content.

5. A method as recited in claim 1, further comprising:
in response to a channel change from a channel, maintaining the recently received content in the single virtual stream; and
upon return to the channel, enabling the user to play back a portion of the recently received content that was stored in the single virtual stream prior to the channel change.

6. A method as recited in claim 5, further comprising presenting, during play back of the recently received content, a user interface that explains why part of the recently received content may not be played back as a result of the channel change.

7. A method as recited in claim 1, wherein the first recorded program and second recorded program are recorded from a single channel.

8. A method as recited in claim 1, wherein at least a portion of the second recorded program overlaps at least a portion of the pause buffer within the single virtual stream.

9. A digital video recording system comprising:
a memory; and
a stream manager stored in the memory, the stream manager being configured to:
manage a virtual stream to capture recorded programs and broadcast programs in a single stream, the broadcast programs captured in a pause buffer portion of the virtual stream,
omit a portion of a first broadcast program while recording a second broadcast program, the second broadcast program being automatically recorded responsive to a channel change from a channel broadcasting the first broadcast program to a channel broadcasting the second broadcast program, and
present, during play back of the first broadcast program, a user interface that explains why part of the first broadcast program cannot be played back as a result of the channel change.

10. A digital video recording system as recited in claim 9, wherein the virtual stream has an arbitrary length and defines a history of stored content including live broadcast programs currently captured in the pause buffer portion as well as previously recorded programs.

11. A digital video recording system as recited in claim 9, wherein the virtual stream comprises:
a first section to define the pause buffer portion for holding currently captured content so that, when a user pauses the program and subsequently resumes play, the content held in the pause buffer portion is played back to the user; and
a second section outside of the pause buffer portion to hold one or more recorded programs.

12. A digital video recording system as recited in claim 9, wherein the stream manager maintains references to identify start and end points of each of the recorded programs in the virtual stream.

13. A digital video recording system as recited in claim 9, wherein first and second recorded programs, which are fully recorded, overlap one another in the virtual stream.

14. A digital video recording system as recited in claim 9, wherein content captured in the pause buffer portion is maintained persistently as a recorded program.

15. A digital video recording system as recited in claim 9, further comprising logic configured to present, during playback of the first broadcast program or second broadcast program, a user interface that explains that the omitted portion was not recorded and cannot be played back due to the channel change.

16. A digital video recording system as recited in claim 9, embodied as one of a television-based entertainment system or a computing device.

17. A digital video recording system as recited in claim 9, wherein the stream manager is further configured to:
omit a portion of a first broadcast program responsive to an unexpected power loss, a loss of a distribution network, or technical difficulties at a content provider; and
present, during the play back of the first broadcast program, the user interface that explains why part of the first broadcast program cannot be played back as a result of the unexpected power loss, the loss of the distribution network, or the technical difficulties at the content provider.

18. A computer storage device comprising computer-executable instructions stored on the computer storage medium that, when executed by a processor, direct a digital video recording system to perform operations including:
receiving broadcast programs from one or more broadcast channels;

storing a current broadcast program in a first section of a single virtual stream;

maintaining a plurality of previous broadcast programs in a second section of the single virtual stream that overlaps with the first section of the single virtual stream, wherein the plurality of previous broadcast programs maintained in the second section of the single virtual stream are recorded temporally before the current broadcast program being stored in the first section of the single virtual stream; and enabling a user to move through the current broadcast program and one of the previous broadcast programs during playback, wherein the current broadcast program and the previous broadcast program include different program content.

19. A computer storage device as recited in claim 18, wherein the first section forms a pause buffer and one of the previous broadcast programs is partially contained in the pause buffer and partially maintained in the second section of the single virtual stream.

20. A computer storage device as recited in claim 18, wherein the operations further include:

enabling the user to pause and resume play of content stored in the first section of the single virtual stream; and enabling playback of one or more previous broadcast programs maintained in the second section of the single virtual stream.

\* \* \* \* \*